United States Patent [19]
Waugh et al.

[11] Patent Number: 6,115,205
[45] Date of Patent: Sep. 5, 2000

[54] METHOD FOR ADAPTING SEEKS OF A DISC DRIVE TRANSDUCER TO THE MAXIMUM ACTUATOR CURRENT AVAILABLE TO ACCELERATE AND DECELERATE THE TRANSDUCER

[75] Inventors: David C. Waugh, Oklahoma City; Randall D. Hampshire, Edmond, both of Okla.

[73] Assignee: Seagate Technology, Inc., Scotts Valley, Calif.

[21] Appl. No.: 08/212,203

[22] Filed: Mar. 11, 1994

[51] Int. Cl.$^7$ ........................................... G11B 5/596
[52] U.S. Cl. .............................. 360/78.06; 318/632
[58] Field of Search .................. 360/78.04, 78.06, 360/78.07, 78.09; 318/561, 632

[56] References Cited

U.S. PATENT DOCUMENTS

| | | | |
|---|---|---|---|
| 4,355,273 | 10/1982 | DuVall | 360/78.07 X |
| 4,535,372 | 8/1985 | Yeakley | 360/77.05 |
| 4,638,230 | 1/1987 | Lee | 360/78.06 |
| 4,679,103 | 7/1987 | Workmann | 360/77 |
| 4,827,200 | 5/1989 | Ogura et al. | 318/561 |
| 4,835,633 | 5/1989 | Edel et al. | 360/78.04 |
| 4,899,234 | 2/1990 | Genheimer | 360/78.06 |
| 5,111,349 | 5/1992 | Moon | 360/78.06 |
| 5,119,250 | 6/1992 | Green et al. | 360/78.09 |
| 5,182,684 | 1/1993 | Thomas et al. | 360/78.06 |
| 5,262,907 | 11/1993 | Duffy et al. | 360/77.05 |
| 5,305,161 | 4/1994 | Giovanetti et al. | 360/78.06 |
| 5,305,447 | 4/1994 | Hampshire | 395/425 |
| 5,475,545 | 12/1995 | Hampshire et al. | 360/78.04 X |
| 5,475,663 | 12/1995 | Ogino | 360/78.06 X |

OTHER PUBLICATIONS

R.K. Oswald "Design of a Disk File Head–Positioning Servo"; Nov. 1974; pp. 506–512.

Francis W. Sears, Mark W. Zemansky and Hugh D. Young; *College Physics* Sixth Edition; Jun. 1986; pp. 46–50 and pp. 544–548.

*Primary Examiner*—Andrew L. Sniezek
*Attorney, Agent, or Firm*—Crowe & Dunlevy

[57] ABSTRACT

A method for adapting acceleration and deceleration of a disc drive transducer during movements between initial and target tracks on a disc surface to the maximum current available to drive an actuator whereon the transducer is mounted. During acceleration of the transducer, while the actuator current is substantially a maximum, the current supplied to the actuator coil is measured and a scale factor is determined as the square root of the ratio of the maximum current supplied to the actuator and a nominal current from which a velocity profile, used to effect velocity control of the movement, has been predetermined. Thereafter, the current supplied to the actuator is adjusted in a succession of time intervals by measuring the velocity of the transducer, determining a profile velocity in each interval from the velocity profile, generating a demand velocity by scaling the profile velocity by the scale factor, generating a correction signal from the difference of the measured and demand velocities, and supplying current to the actuator in proportion to the correction signal.

7 Claims, 4 Drawing Sheets

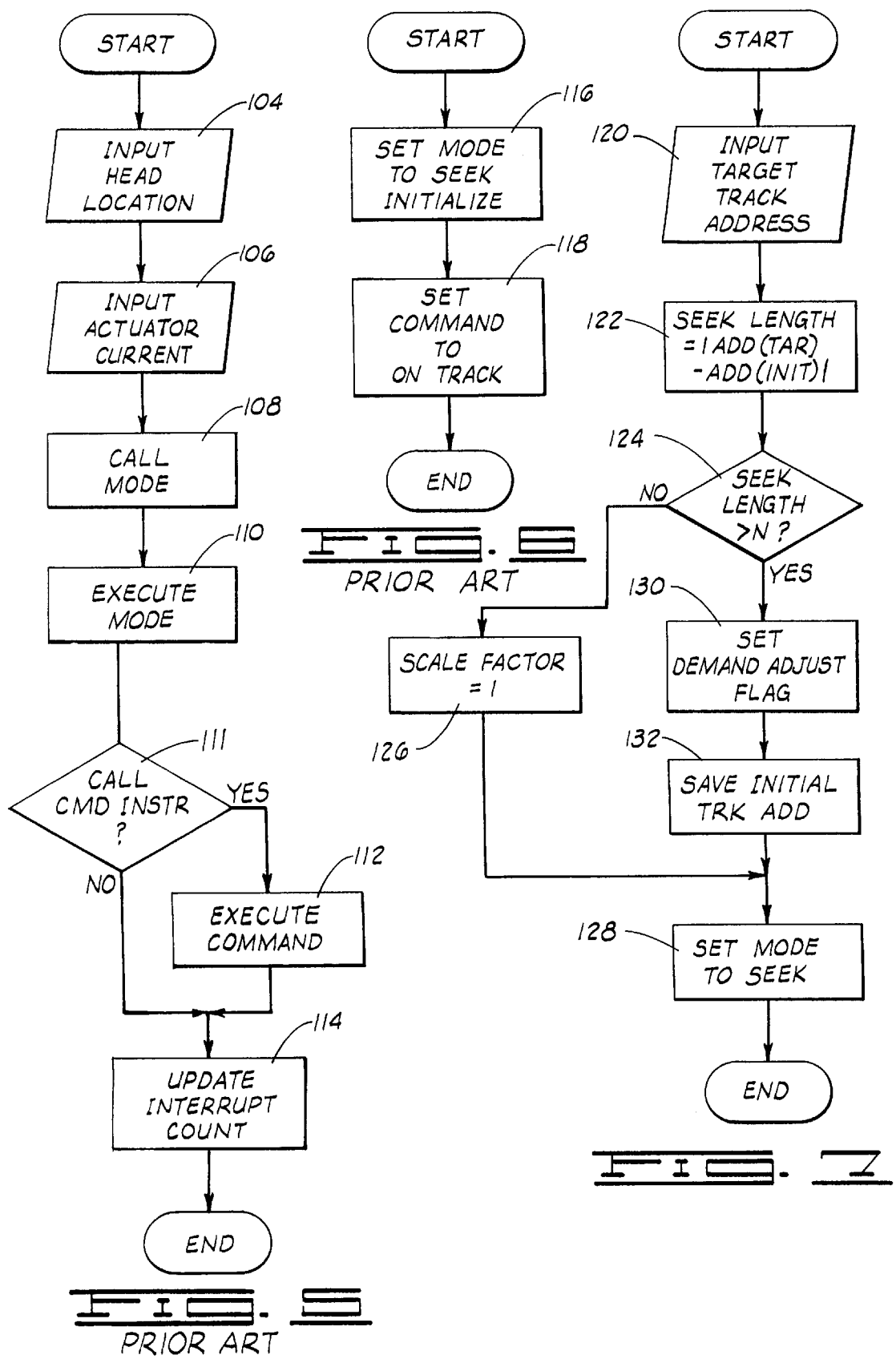

METHOD FOR ADAPTING SEEKS OF A DISC DRIVE TRANSDUCER TO THE MAXIMUM ACTUATOR CURRENT AVAILABLE TO ACCELERATE AND DECELERATE THE TRANSDUCER

BACKGROUND OF THE INVENTION

1. Field of the Invention

The present invention relates generally to improvements in disc drive servo methods, and, more particularly, but not by way of limitation to improvements in methods for accessing tracks to which computer files are to be stored or from which a file is to be retrieved.

2. Brief Description of the Prior Art

In a disc drive for storing computer files, the files are stored along concentric, circular data tracks that are defined in magnetizable coatings on surfaces of rotating discs and the files are written, and subsequently read, by transducers that fly over the disc surfaces in close proximity to the surfaces. The tracks on different disc surfaces are organized into cylinders, each containing a track on one surface, and the transducers are mounted on an actuator that aligns the transducers so that the transducers all bear substantially the same spatial relationship to the cylinders. Thus, alignment of one transducer with a selected track results in substantial alignment of the other transducers with tracks in the same cylinder.

The actuator is pivotally supported on the disc drive case and comprises a coil that is immersed in a magnetic field, provided by permanent magnets on the drive case, so that currents supplied to the actuator coil will result in forces on the actuator that can be used to maintain alignment between the transducers and a selected cylinder or to move the transducers from a cylinder with which the transducers are presently aligned to a new cylinder which contains a target track from which a previously stored file is to be retrieved or to which a new file is to be written.

Conventionally, movements of the transducers between cylinders have been effected in two phases, a seek phase and an ensuing settle phase. The seek phase, with which the present invention is concerned, employs a velocity control approach in which the velocity of the transducers in each of a succession of time intervals is determined and compared to a velocity taken from a predetermined velocity profile that is expressed as a function of the distance to a target track and decreases to zero as the distance to the target track decreases to zero. Correction signals, each generated from the difference between the transducer velocity in each time interval and the profile velocity determined for that interval, are transmitted to an actuator driver that, ideally, passes a current through the actuator coil in proportion to the correction signal. Thus, during terminal portions of the seek in which the transducers are decelerated toward the cylinder containing the target track, the transducers are caused, ideally, to follow a trajectory in which the velocity of the transducers substantially follows the velocity profile toward a velocity of zero at the target cylinder; that is, the cylinder that contains the target track. (During initial portions of the seek in which the transducers are accelerated from initial tracks being followed at the time the seek commences, the velocity of the transducers will vary significantly from the velocity profile for reasons that will become clear below.) The settle phase, which begins shortly before the transducers reach the target cylinder, is then used to bring the transducers to rest at the target cylinder.

The advantage afforded by velocity control of the transducers during seeking is that, at least in principle, the time required to effect movement of the transducers can be minimized by appropriate design of the velocity profile and it will be useful to consider a particular profile design that has been used for this purpose. Initially, electrical power for the operation of the disc drive and, more particularly, the actuator driver is supplied by the computer with which the disc drive is used at, ideally, a design voltage such as 12 volts. Based upon this design voltage, the actuator driver can supply, again ideally, a maximum design current that depends upon the construction of the actuator driver and corresponds to a particular correction signal received by the actuator driver. For larger correction signals, the actuator driver will saturate to supply the maximum current of which it is capable.

Since the acceleration and deceleration of the transducers is substantially proportional to the current supplied by the actuator driver, the velocity profile can, in principle, be designed by requiring the deceleration of the transducers to be the maximum deceleration possible using the maximum current the actuator driver is designed to supply. This deceleration will be known from the construction of the actuator driver, the structure of the actuator coil and the locations and structures of the permanent magnets surrounding the actuator coil. Thus, the velocity profile can be generated by calculating the distance required to stop the transducers from each of a selection of velocities up to a maximum velocity the transducers are to have during the seek. The velocities and the distances are then stored; for example, as a look up table, as the portion of the velocity profile that corresponds to deceleration of the transducers. For distances greater than the distance required to stop the transducers from the maximum velocity they are to achieve, the profile velocities are selected to be such maximum velocity.

The manner in which such a velocity profile minimizes the time required for a seek can be seen by considering the manner in which a lengthy seek would generally, at least in principle, proceed using this velocity profile. At the time the seek begins, the velocity of the transducers will be zero while the profile velocity will be substantially the maximum velocity determined by the profile. Accordingly, the correction signal determined for the first time interval, and a number of succeeding time intervals, will generally exceed the maximum correction signal for which the actuator driver supplies a maximum current to the actuator coil. (That the correction signal will exceed the correction signal corresponding to maximum actuator coil current can be seen from the design of the velocity profile to provide maximum deceleration over a series of time intervals in which the transducer velocities substantially follow the velocity profile.) As a result, the actuator driver will saturate to provide the maximum current of which it is capable to the actuator coil to cause maximum acceleration of the transducers that will cause the transducer velocity to reach the velocity profile in a minimum time. Thereafter, the transducers will move at substantially the maximum speed they are to have during the seek until the distance from the target track at which deceleration from the maximum is to commence. The deceleration then occurs, because of the design of the profile described above, at the maximum rate determined by the maximum current that can be supplied by the actuator driver. Consequently, the transducers will move at the maximum speed selected for the seek or will be accelerated and decelerated at the maximum possible rate throughout the seek to minimize the time required for the seek.

In practice, seeking using a velocity profile determined using the design values of the voltage supplied to the actuator driver and the maximum design current the actuator driver can provide at this voltage is not feasible. The voltage supplied to the actuator driver varies with time to vary the maximum current that can be supplied to the actuator coil and the resistance of the coil similarly varies with time as currents passed through the coil in repeated transducer movements heat the coil. Consequently, the maximum design current cannot be reliably achieved with the result that the corresponding maximum deceleration of the transducers cannot be reliably achieved. Accordingly, should the profile velocity be designed using the maximum design current, the deceleration of the transducers would often occur at too small a rate for the transducers to closely follow the velocity profile. Thus, the transducers would commence settle with an excessive velocity that would, in many circumstances, cause excessive overshoot of the target cylinder that would prevent termination of the movement of the transducers at the target cylinder. That is, the transducers would be settled on the wrong cylinder. In such cases, a reseek of the target cylinder would be required to access the target track.

Because of these variations in the current supply capacity of the actuator driver, it is common practice to design the velocity profile using a nominal current that is a selected percentage of the maximum design current the actuator driver can supply. In the past, this nominal current has been selected on the basis of worst case conditions with the result that the time required to effect a seek has been unduly lengthened. In particular, to insure that the transducers can be settled on the target cylinder, the nominal current must generally be selected to be of the order of only 80 to 90 percent of the maximum design current. Since the time for the seek phase to be carried out depends upon the maximum acceleration and deceleration of the transducers, in turn depending upon the nominal current, the choice of a low nominal current must necessarily result in undesirable increases in transducer movement time.

Moreover, selection of higher nominal currents, subject only to the condition that settle on the target cylinder will occur, gives rise to a second problem. When the maximum current that can be supplied to the actuator coil is substantially less than this nominal current, even though such current is capable of effecting settle on the target cylinder, the excessive transducer velocity with which settle begins can result in an initial, relatively large, excursion of the transducers from the centers of the tracks of the target cylinder that will require an undesirably long time to correct. Thus, in general, selection of a relatively large nominal current to design a velocity profile that will minimize the time required for the seek will often result in a corresponding increase in settle time following the seek. Alternatively, attempts to minimize the settle time generally require velocity profile design using a lower nominal current that will increase the time required to move the transducers to the distance from the target track at which settle commences. Consequently, while the velocity control has proven to be an effective way of effecting the seek phase of transducer movements, such control has not, prior to the present invention, permitted such movements to be effected in an optimal time.

SUMMARY OF THE INVENTION

The present invention optimizes the velocity control approach to seeking by providing a method for effecting the seek phase which is continuously adaptive to compensate for variations in the maximum current that can be supplied to the actuator coil, under existing conditions, during deceleration of the transducers. Consequently, the nominal current used to design a velocity profile can be readily increased to 95 percent of the maximum actuator driver design current and, in many cases, to 99 percent by appropriate selection of parameters used in the inventive method. Thus, the time required to accomplish the seek phase, at such times that a relatively large actuator coil current is available to effect the seek phase, can be substantially reduced without loss of the capacity to terminate movement of the transducers at the target cylinder at such times that a lower actuator coil current is available.

To these ends, the present invention makes use of the characteristics of the acceleration of the transducers with respect to time following commencement of the seek phase; more particularly, the invention makes use of a maximum in the accelerating current that will occur shortly after a seek commences and is proportional to the maximum acceleration the transducers can achieve. This maximum in the current supplied to the actuator driver occurs at a distance from the track from which the seek phase commences that, for relatively long transducer movements, is substantially the same for all movements and can be predetermined by observing the actuator coil current under a variety of operating conditions. During transducer movement in accordance with the inventive method, a measure of this maximum current is obtained by measuring the actuator coil current during one or more time intervals of the seek phase following commencement of the transducer movement and is used to generate a scale factor that increases with the ratio of the measured maximum current to the nominal current used to design the velocity profile. Thereafter, in each time interval in which the velocity control is effected, the profile velocity is determined in the conventional manner but is not used to directly generate the correction signal that is outputted to the actuator driver. Instead, in each time interval, the profile velocity is scaled by the scale factor to determine a demand velocity that is used to generate the correction signal in proportion to the difference between the demand velocity and the velocity of the transducers across the disc surfaces. The correction signal is then transmitted to the actuator driver to determine the current the actuator driver passes through the actuator coil.

As a result of the use of the demand velocity so determined, the maximum speed that will be reached by the transducers during the acceleration portion of the seek phase will depend upon the scale factor; that is, on the maximum current the

BRIEF DESCRIPTION OF THE DRAWINGS

FIG. 5 is a flow chart of an interrupt program that can be used to effect seeking in accordance with the present invention.

FIG. 6 is a flow chart of a seek command routine carried out during the interrupt program of FIG. 5.

FIG. 7 is a flow chart of a seek initialization mode routine carried out during the interrupt program of FIG. 5.

DESCRIPTION OF THE DISC DRIVE

Figure 1:
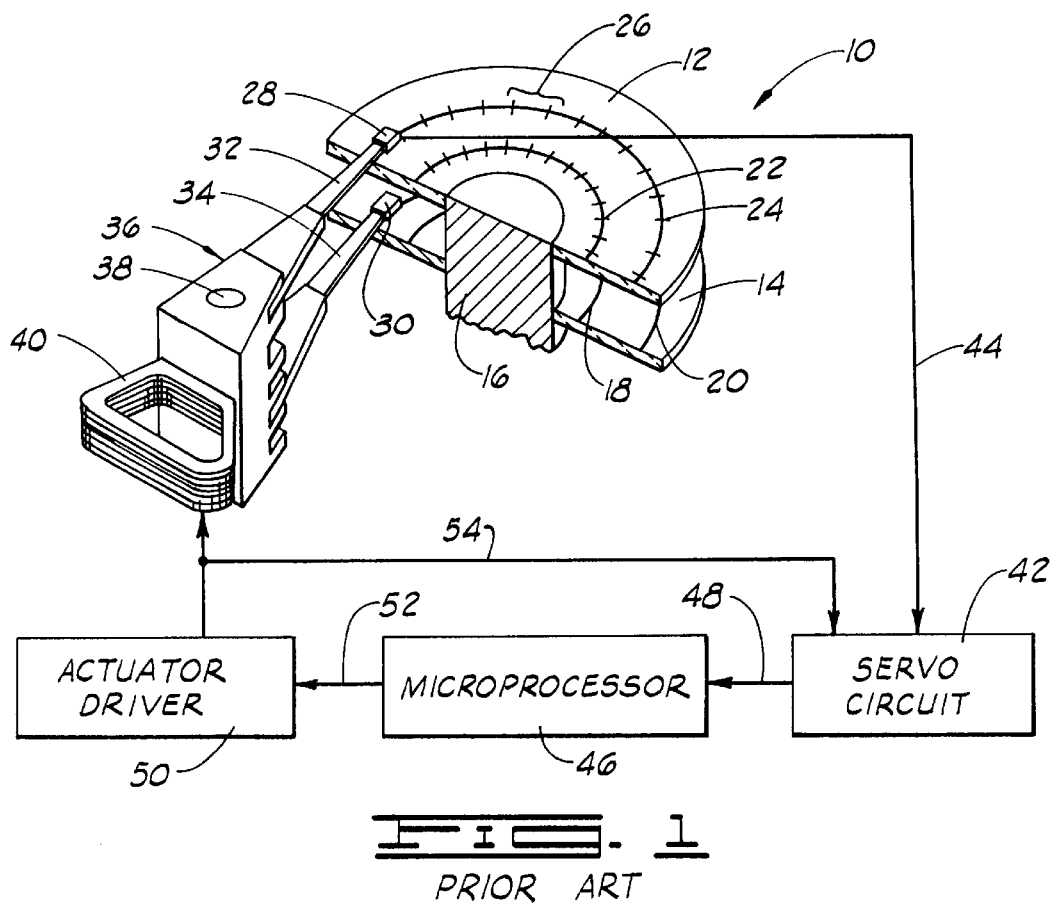
FIG. 1 is a schematic representation of a disc drive in which the inventive method can be practiced.

Referring now to FIG. 1, shown therein and designated by the general reference numeral 10 is a schematic representation of a disc drive illustrating features that are used in the practice of the present invention. In general, the disc drive 10 is comprised of a plurality of discs, two of which have been illustrated in FIG. 1 and designated 12 and 14 therein, that are mounted on a spindle 16 for rotation about the disc axes by a spindle motor (not shown).

The discs 12, 14 are provided with magnetizable surface coatings so that computer files can be written along concentric, circular data tracks, such as the data tracks 18 and 20, defined on the upper surface of the disc 14. For purposes of illustration, FIG. 1 contemplates the upper surface of the disc 12 will be a dedicated servo surface on which are defined a series of concentric, circular servo tracks, such as the servo tracks 22 and 24. In disc drives including a dedicated servo surface, an example of which is more completely described in U.S. Pat. No. 5,262,907 issued Nov. 16, 1993 to Duffy et al, the servo tracks are divided into a plurality of repeating servo frames, such as the frame 26 on the track 24, and each servo frame is comprised of address and position fields which are read during track seeking for a purpose that will be described below. A typical configuration for these fields, which are written to the servo tracks at the time of disc drive manufacture, is described in the aforementioned U.S. Pat. No. 5,262,907, the teachings of which are hereby incorporated by reference. While, for simplicity of description, the disc drive 10 and the manner in which the inventive method will be described for a disc drive that includes, as in U.S. Pat. No. 5,262,907, a dedicated servo surface, it will be clear to those of skill in the art that the method of the present invention can equally well be practiced in a disc drive that makes use of an embedded servo system; that is, a disc drive in which the servo frames are written between data sectors along data tracks that are used to store computer files.

The disc drive 10 is further comprised of a plurality of transducers, two of which have been illustrated in FIG. 1 and designated by the numerals 28 and 30 therein. The transducers 28 and 30 are supported by flexures, 32 and 34 respectively, that extend from one end of an actuator 36 so that the transducers will fly over the disc surfaces, in very close proximity thereto, at such times that the discs 12 and 14 are rotated by the spindle motor.

The actuator 36 is pivotally mounted on a spindle 38, which is, in turn, supported by the disc drive case (not shown) and is comprised of a coil 40 that is immersed in a magnetic field provided by permanent magnets (not shown) that are similarly mounted on the disc drive case. Accordingly, a pivoting force can be exerted on the actuator 36 by passing an electrical current through the coil and, in general, such force will be proportional to the magnitude of the current in accordance with the familiar Lorentz relation. Such forces are used in the operation of the disc drive to move the servo transducer 28 radially across the dedicated servo surface to access a selected track on the dedicated servo surface and subsequently to maintain alignment between the accessed track and the servo transducer 28. (As is conventional, the data and servo tracks are organized into concentric cylinders, each comprising a track on each disc surface, and the transducers are axially aligned so that a data track can be accessed by accessing a servo track in the same cylinder as the data track and followed by following a servo track in the same cylinder.)

To control movement and subsequent track following by the servo transducer 28 and, consequently, movement and subsequent track following by the data transducers used to read and write computer files to the data surfaces (the reading and writing of files is conventional and need not be described for purposes of the present disclosure), the disc drive 10 is comprised of a servo system (not generally designated in the drawings) that has been schematically represented in FIG. 1. (For a more detailed description of a servo system, see the aforementioned U.S. Pat. No. 5,262,907.) In general, the servo system is comprised of a servo circuit 42 that receives, on an analog signal path 44, electrical signals generated in the servo transducer 28 by passage of the servo frames 26. From signals generated by passage of the address and position fields, the servo circuit 42 determines the address of the servo track nearest the servo transducer 28 and the position of the servo transducer 28 with respect to such track each time a servo frame passes the servo transducer 28 and presents the track address and servo transducer position to a microprocessor 46 on a digital signal path 48 in FIG. 1. Thus, the radial location of the servo transducer 28 is repetitively measured as the discs are rotated to cause servo frames to pass the servo transducer 28. Additionally, and as taught in the aforementioned U.S. Pat. No. 5,262,907, the servo circuit generates an interrupt of the microprocessor 46 so that, in each time interval marked by an interrupt of the microprocessor 46, the microprocessor 46 determines the radial location of the servo transducer 28.

The servo system is further comprised of an actuator driver 50 that receives correction signals, to be described below, for controlling the movement of the servo transducer 28 across the dedicated servo surface, on a digital signal path 52, and responds by passing a current through the coil 40 of the actuator on a digital signal path 54. As taught in the aforementioned U.S. Pat. No. 5,262,907, the actuator driver 50 can actuator driver can supply under current operating conditions. Consequently, at times that the maximum current that can be supplied by the actuator driver is relatively small in relation to the nominal current used to design the velocity profile, deceleration of the transducers toward the target track will commence with a transducer velocity that is lower than the velocity they would otherwise have, to compensate for the reduced current available to effect the deceleration. Thus, during deceleration, smaller currents, currents that are within the maximum current the actuator driver can supply, will be required to reduce the transducer velocity to a value that will ensure settling on the target track. Consequently, the nominal current used to design the velocity profile can be made a relatively large percentage of the maximum design current of the actuator driver without loss of the ability to terminate movement of the transducers at the cylinder that contains the target track. As a result, the seek will be carried out in a minimum time that is consistent with the actuator current that is available to effect deceleration of the transducers. Similarly, at such times that the maximum current the actuator driver can supply is substantially equal to the nominal current used to design the velocity profile, the demand velocity in each time interval will be substantially equal to the profile velocity to again result in a minimum seek time. The net result is that the seek phase will be carried out using the maximum current available under existing circumstances to accelerate and decelerate the transducers at a rate that will minimize the time for effecting the seek phase.

Additionally, the seek method of the present invention minimizes settle time following the seek. The use of the demand velocity in place of the profile velocity during deceleration will cause the transducers to substantially follow a trajectory that differs from the velocity profile only by the scaling that results from use of the demand velocity to determine the correction signal that is outputted to the actuator driver to control the actuator coil current. Thus, settling will commence at the end of any seek phase with a velocity that will minimize excursions of the transducers from the centers of the tracks of the target cylinder during settle. Consequently, the settle phase will be carried out in the minimum time that is consistent with the actuator coil current that is available under existing conditions.

An important object of the present invention is to minimize the time required to access data tracks on which computer files are stored.

Another object of the invention is to provide a method for effecting the seek phase of transducer movements that compensates for variations in electrical current available to accelerate and decelerate disc drive transducers to minimize the time required to effect the seek phase under existing conditions of operation of the disc drive.

Yet a further object of the invention is to minimize the time required to settle transducers of a disc drive on a target cylinder following the execution of the seek phase.

Other objects, features and advantages of the present invention will become apparent from the following detailed description when read in conjunction with the drawings and appended claims. be comprised of a latch (not shown), a DAC (not shown) and an H-bridge (not shown) that will pass a current through the coil 40 in proportion to the correction signal received from the microprocessor 46 up to the maximum available current the actuator driver can provide. For values of the correction signal greater than the value corresponding to this maximum current, the actuator driver 50 will saturate and pass the maximum current the actuator driver 50 can supply, under existing operating conditions, through the coil 40. In the practice of the present invention, the current presently being passed through the actuator coil 40 is supplied to the servo circuit 42, on an analog signal path 54, for input by the microprocessor 46 on the digital signal path 48 each time the microprocessor is interrupted by the servo circuit 42.

THE VELOCITY PROFILE

Figure 2:
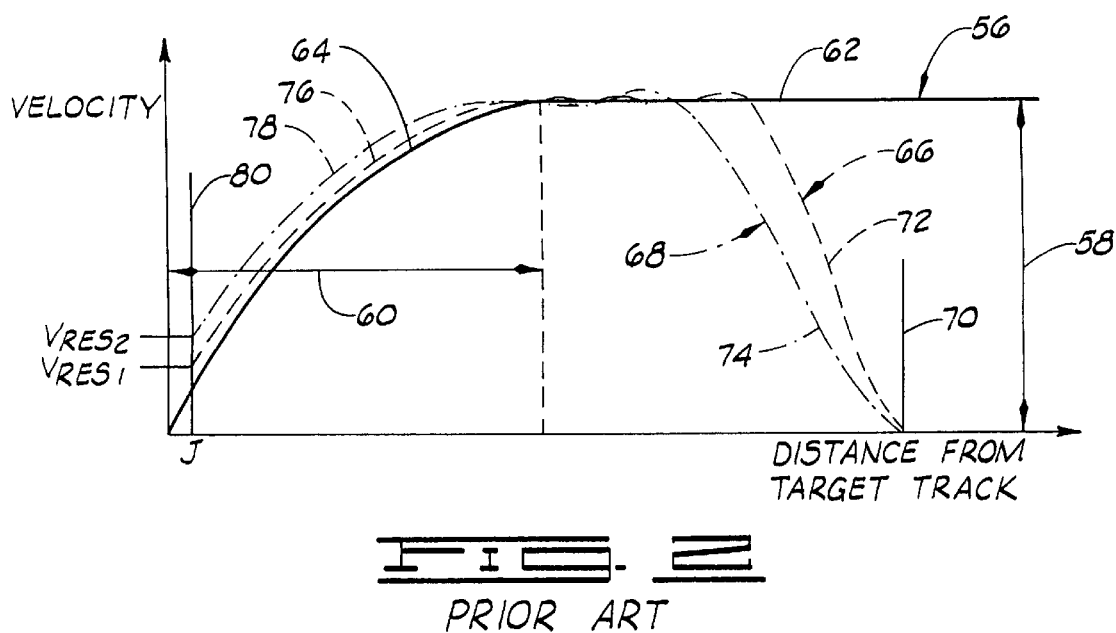
FIG. 2 is a graph of a velocity profile illustrating prior art seeks.

Referring to FIG. 2, shown therein and designated by the numeral 56 is a graph of a conventional velocity profile, presented in relation to the distance from a target track, that is used to control the movement of the servo transducer 28 between tracks on the dedicated servo surface; that is the upper surface of disc 12 in FIG. 1. For purposes of discussion, the velocity profile shown in FIG. 2 has been selected to minimize the time required for a seek, in accordance with the prior art, and the manner in which such a profile is developed and used will now be discussed to place the invention in perspective.

The development of the minimum seek time profile 56 begins with the selection of a maximum velocity the transducers are to achieve during a seek and such velocity has been indicated at 58 in FIG. 2. Once the maximum velocity has been selected, the distance required to decelerate the transducers to rest from the maximum velocity is determined using the nominal maximum current that the actuator driver 50 is to supply to the actuator coil 40 and the characteristics of the coil and the magnets (not shown) that are positioned about the coil to determine the maximum deceleration of the transducers from the nominal current. As noted above, the nominal current will conventionally be of the order of 80 to 90 percent of the maximum design current of the actuator driver. This maximum distance required to decelerate the transducers to rest defines a maximum deceleration length that has been illustrated at 60 in FIG. 2. For seek lengths greater than the maximum deceleration length, the profile velocity; that is, the velocity the profile is to yield for a specific distance to the target track, is selected to be the maximum velocity the transducers are to attain during a seek, as indicated by the portion 62 of the profile 56. For target track distances less than the maximum deceleration length, the profile velocities are selected by determining the distance required to stop the transducers from any velocity less than the maximum seek velocity as illustrated by the portion 64 of the profile 56 in FIG. 2. The velocity profile is determined during manufacture of the disc drive and stored, using either a look up table or coefficients of an equation that expresses the form of the profile within the distance 60, in the memory of the microprocessor 46.

In order to contrast the invention with prior art seek methods, the transducer velocity as a function of distance to the target track has been illustrated, at 66 and 68, for differing conditions under which a seek might be made. In particular, the curve 66 contemplates a maximum available current that approaches or exceeds the nominal current while the curve 68 contemplates a lower maximum available current that might occur as the result of a low power supply voltage to the actuator driver 50 or a high actuator coil resistance arising from heating of the actuator coil 40 or both. Both curves contemplate that the seek will be initiated from an initial track; for example, the track 24 in FIG. 1, that is located a distance indicated by the line 70 from the target track; for example, the track 22 in FIG. 1, that is represented by the velocity axis in FIG. 2.

Once the seek is initiated, the servo circuit 42 will determine the address of the servo track with which the transducers are most closely aligned and the position of the transducers with respect to such track each time a servo frame passes the servo transducer 28 and place this information on the digital signal path 48 to be inputted to the microprocessor 46 during an interrupt of the microprocessor 46 that is subsequently generated by the servo circuit 42. During each interrupt, the microprocessor 46 determines the distance between the transducers and the target track from the transducer location information and the address of the target track and, further, determines the velocity of the transducers across the disc surfaces at the beginning of the interrupt. (As is known in the art, the velocity of the transducers can be determined either from the location of the transducers in successive interrupts or from such locations and the actuator coil current. The approach used generally depends upon the accuracy with which it is desired to measure the transducer velocity and will vary from one disc drive to another.) A correction signal, proportional to the difference between the profile velocity, determined in relation to the distance to the target track in each interrupt, and the velocity of the transducers across the disc at the time of the interrupt, is then determined and outputted to the actuator driver.

At the time the seek begins, the velocity of the transducers will be substantially zero with the result that the correction signal will, for the lengthy seeks illustrated in FIG. 2, exceed the correction signal corresponding to the maximum current the actuator driver 50 can supply to the actuator coil 40. (As is known in the art, saturation may also occur for seeks that are initiated within the maximum deceleration distance 60 shown in FIG. 2.) Consequently, the actuator driver will saturate and pass the maximum current of which it is capable through the actuator coil 40 to initiate acceleration of the transducer 28 toward the target track. However, since the maximum current the actuator driver 50 can supply will depend upon conditions existing at the time the seek is made, the acceleration will differ from one seek to another. Thus, for a relatively large maximum available current, the transducer 28 will rapidly approach the maximum velocity indicated by the portion 62 of the profile 56 as indicated by the portion 72 of the curve 66. Conversely, for a relatively small maximum available current, the transducer 28 will approach the maximum profile velocity at a slower rate indicated by the portion 74 of the curve 68. For a relatively long seek, the transducer 28 will reach the maximum profile velocity in both cases and coast at this velocity as indicated by flat portions (not numbered) of the curves 66 and 68 that lie along the portion 62 of the velocity profile 56. The differing times that are required for the transducer 28 to reach the maximum profile velocity will generally depend upon the maximum current that can be supplied to the actuator coil 40 but will not materially effect the overall time that will be required to move the transducer 28 to the target track. Rather, the time for such movement is more strongly affected by the deceleration of the transducer 28 to the target track as will now be discussed with further reference to FIG. 2.

After the transducer 28 reaches the maximum deceleration length 60 at which deceleration is to begin for the length seeks shown in FIG. 2, the profile velocity in each interrupt will decrease so that the velocity of the transducer 28 will exceed the profile velocity in succeeding interrupts to cause the correction signal to become negative, with respect to the correction signal during acceleration. Thus, the transducer 28 will begin a deceleration phase in which the velocity of the transducer 28 generally follows the portion 64 of the velocity profile 56 but will lag the velocity profile by an amount that will depend upon the current supply capabilities of the actuator driver 50. More particularly, the relationship between the current supplied to the actuator coil 40 and the correction signal will depend upon the same factors that determine the maximum current the actuator driver can supply to the actuator coil 40. Hence, under conditions in which the actuator driver 50 can supply a relatively large current to the actuator coil 40, the transducer velocity will closely follow the velocity profile as indicated by the continuation 76 of the curve 66. Under conditions in which the actuator driver 50 can supply only a relatively small current, a larger lag will occur as indicated by the continuation 78 of the curve 68. Consequently, the transducer 28 will reach a distance at which settle is to begin, indicated by the line 80 a preselected number of tracks J from the target track, with a velocity that depends upon the existing operating conditions. For conditions in which the actuator driver 50 can supply a relatively large maximum current, the transducer 28 will have a relatively small residual velocity, Vres1 in FIG. 2, and the transducer 28 can be rapidly settled on the target track. In conditions in which the actuator driver can supply a smaller maximum current, the transducer 28 will have a larger residual velocity, Vres2 in FIG. 2, requiring a larger settle time. Moreover, since currents supplied by the actuator driver 50 are used to effect settle, differences in settle time will generally be larger than is indicated by differences in residual velocity. Indeed, in exceptional circumstances, settle from the residual velocity may not be possible with the available actuator coil current so that a reseek of the target track will be required to greatly extend the time for accessing that track. While the differences in settle time and the probability that a reseek will be necessary can be minimized by limiting the nominal current used to generate the velocity profile, such limitation increases the time to effect movement between tracks by limiting the deceleration of the transducer 28 during terminal portions of a seek.

DESCRIPTION OF THE PREFERRED EMBODIMENT

Figure 3:
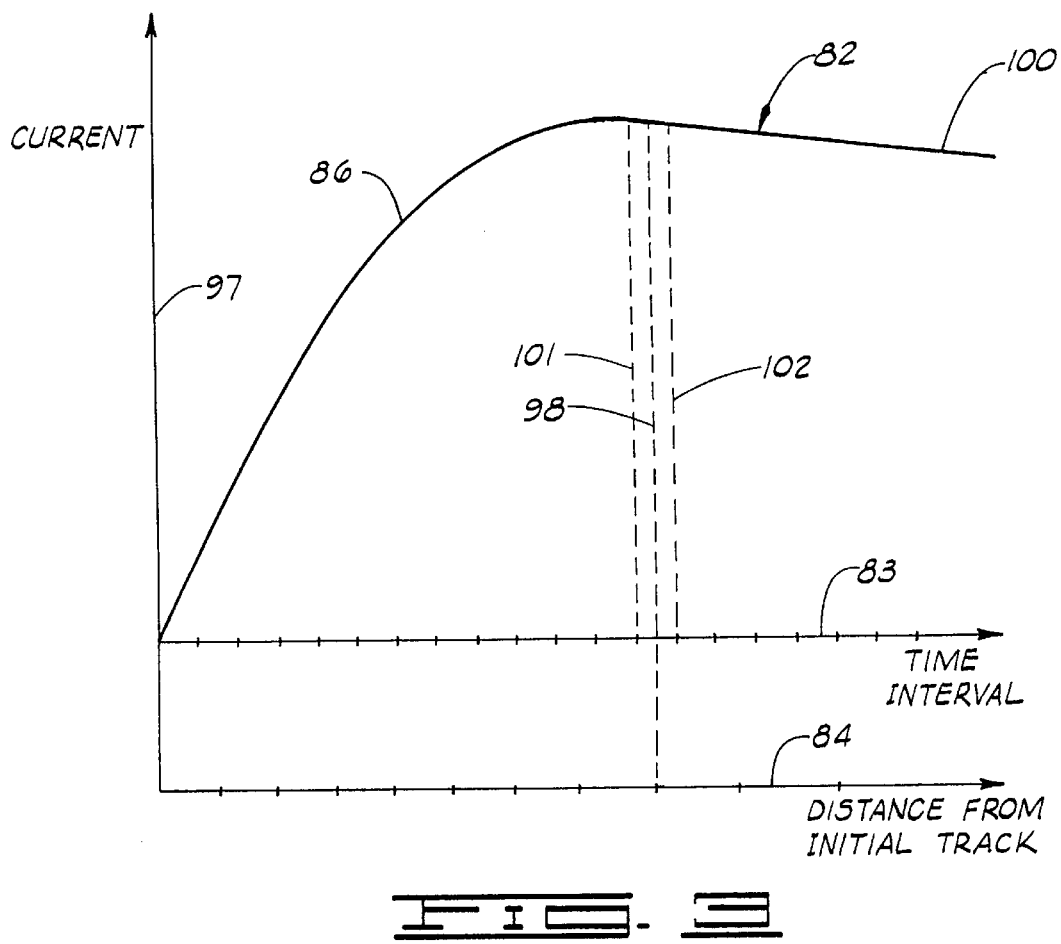
FIG. 3 is a graph of actuator current versus time during a seek indicating the manner in which the maximum available current is determined for seeks made in accordance with the present invention.

With the above introduction, the adaptive seek method of the present invention can now be described with respect to FIGS. 3 through 8. Referring first to FIG. 3, shown therein is a graph 82 of actuator coil current against time (axis 83) and distance (axis 84) from the initial track following commencement of a seek using a velocity profile (56A in FIG. 4) which differs from the profile 56 in that the profile 56A has been determined using a nominal current that can, as will be discussed below, be selected to be up to 99 percent of the maximum design current of the actuator driver 50.

As shown in FIG. 3, the current supplied to the actuator coil 40 when a seek is initiated, using a correction signal that will saturate the actuator driver 50, will rapidly rise to a peak with the rise time generally being determined by the inductance and resistance of the actuator coil 40. This rise time, indicated by the portion 86 of the curve 82 in FIG. 3, has also been indicated in FIG. 4, at 88 and 90, for two transducer velocity curves, 92 and 94 respectively, to the right of a line 96 that corresponds to a distance, selected for a purpose to be described below, indicated by the line 98 in FIG. 3, from the initial track, represented by the axis 97 in FIG. 3 and the line 99 in FIG. 4. (For clarity of illustration, the portions 88 and 90 of the curves 92 and 94 in FIG. 4 have been exaggerated.) Following the peak, the current, again for a correction signal that will saturate the actuator driver 50, will decay as the result of a motion induced back emf in the actuator coil 40 as indicated by the portion 100 of the curve 82. (For clarity of illustration, the decay of the actuator current has been exaggerated in FIG. 3. In general, the speed the transducers will attain during the time the actuator coil current reaches a maximum will be small so that the actuator coil current decays very slowly with respect to time, and distance from the initial track, after the maximum current has been reached.)

Figure 4:
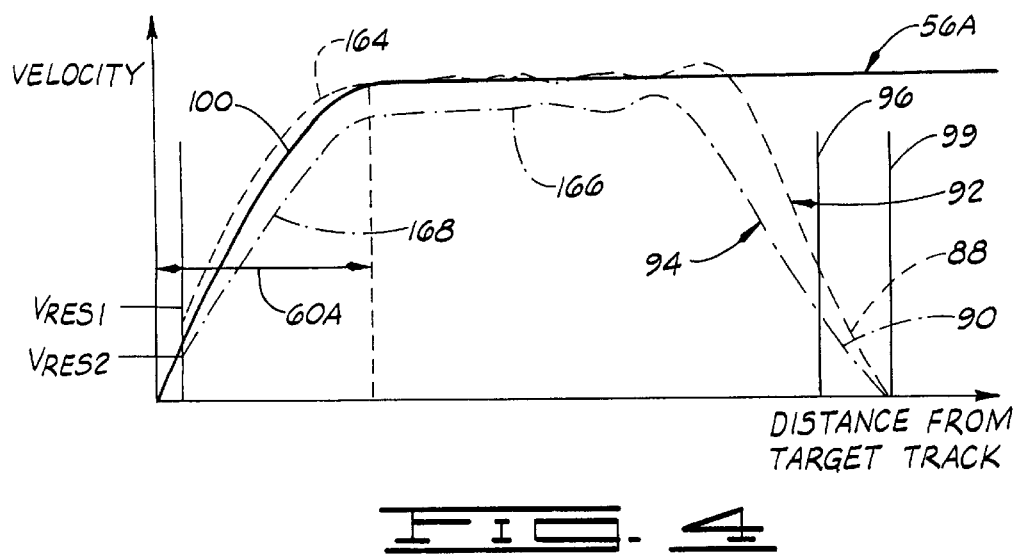
FIG. 4 is a graph of a velocity profile illustrating the manner in which seeks are carried out in accordance with the present invention.

In general, while the time at which the actuator coil current peaks will exhibit some variation with existing conditions, such variation will generally be small, as can be seen from a comparison of the transition regions between the lines 96 and 99 in FIG. 4 over which the initial increase in actuator current changes to a decrease for the curves 92 and 94. Moreover, since the back emf governed decay in the current is slow in initial portions of a seek, the actuator coil current, under a variety of existing conditions, at a distance indicated by the line 98 that the transducers reach in a time interval 101 following the peak of the current curve in FIG. 3, will be substantially the maximum actuator coil current the actuator driver 50 can supply under substantially any operating conditions that may exist at the time a seek is made. Thus, the actuator currents for the time interval 101 and the following interval 102 provide a measure of the maximum current that can be supplied to the actuator coil 40 by the actuator driver 50 under existing operating conditions. The distance 98 in FIG. 3 is predetermined; for example, from oscilloscope traces of the actuator current during seeks made under a variety of disc drive operating conditions and used in adapting seeks to the maximum available actuator coil current in a manner that will be described with reference to flow charts presented in FIGS. 5 through 8.

Before turning to these flow charts, a few additional points concerning the velocity profile 56A of FIG. 4 are in order. Like the velocity profile 56 of FIG. 2, the velocity profile 56A can be selected to be a profile designed to effect deceleration of the transducers in the least possible time. In such case, the terminal portion 100 of the profile 56A would be developed by determining stopping distances for the transducers from various velocities up to the maximum velocity the transducers are to attain during a seek using a nominal current within the maximum design current of the actuator driver to determine the deceleration of the transducers. Thus, the profile 56A would have the same general form as the profile 56 of FIG. 2. However, a significant difference would exist between these profiles. The maximum distance, indicated at 60A in FIG. 4, over which the transducers are to be brought to rest can be made significantly smaller than the corresponding distance 60 in FIG. 2. In particular, the present invention contemplates that the nominal current used to develop the profile 56A will be selected to be 95 to 99 percent of the maximum design current of the actuator driver 50.

Further, it should be noted that the particular form of the velocity profile shown in the drawings has been presented in the spirit of providing a concrete example that will facilitate an understanding of the present invention but is not limiting. Rather, the present invention can be usefully employed in velocity controlled seeking based on substantially any velocity profile that might be adopted.

In order to simplify the discussion of the manner in which the seek method of the present invention is implemented in a disc drive, FIGS. 5 through 8, which illustrate the programming of the microprocessor 46 to effect a seek in accordance with the invention, have been drawn for a microprocessor that uses the programming approach taught in the aforementioned U.S. Pat. No. 5,262,907. It will, of course, be recognized by those of skill in the art that such programming approach is not limiting but has been included herein in the spirit of providing a concrete example that will facilitate an understanding of the present invention.

As taught in the aforementioned U.S. Pat. No. 5,262,907, servo operations in a disc drive are carried out during each of a succession of executions of a general interrupt program that has been illustrated in FIG. 5. As shown therein, the interrupt program begins with the input of servo data which, in the practice of the present invention, include the location of the servo transducer, or head, inputted at step 104 in FIG. 5, and the actuator current, inputted at step 106 in FIG. 5. Following the input of the servo data, a mode routine is called, step 108, and executed, step 110, and followed by execution of a command routine, step 112, if the mode routine includes a call command instruction. Following the execution of the command routine as indicated by a decision block 111, a count of the number of interrupts that have occurred since an index on the discs has passed the transducer 28 is updated, step 114, and the interrupt ends.

As further taught in the aforementioned U.S. Pat. No. 5,262,907, during track following operations in which the position of transducer 28 is repetitively corrected in fine control mode routines to maintain a specific relationship between the location of the transducer 28 and a selected servo track, a command routine is called to enable the microprocessor 46, a servo microprocessor in the servo system described in the aforementioned U.S. Pat. No. 5,262,907, from a system microprocessor (not shown) that exercises overall control of the operation of the disc drive. When a seek is to be carried out, such command routine will be the seek command routine that has been illustrated in FIG. 6. In this command routine, the mode routine that is to be called in the next interrupt is set to a seek initialize routine, step 116, and the next command routine to be called is set to an on track routine, step 118, that is executed during settling of the transducer 28 on the target track. As noted above, the present invention is effected during the seek phase of movement of the transducer 28 and settling is effected using conventional methods. Hence, the on track command routine need not be discussed for purposes of the present disclosure. Accordingly, the remaining discussion of the method of the present invention will be limited to discussion of the seek initialization mode routine that has been illustrated in FIG. 7 and a seek mode routine that has been illustrated in FIG. 8.

Referring to FIG. 7, the seek initialization routine begins with the input of the target track address from the system microprocessor, step 120, and the determination of the length of the seek, step 122, as the difference in the addresses of the target track and the initial track; that is, the track being followed at the time the seek command is received. Following determination of the seek length, a test is carried out to determine whether the seek length is greater than a preselected minimum seek length, step 124. Such minimum seek length is selected to insure that the maximum current that will be supplied by the actuator driver 50 during the seek at hand will be substantially the maximum current the actuator driver can supply under existing conditions. For short seeks, the seek length will be less than the maximum deceleration length defined above so that the initial correction signal supplied to the actuator driver may, or may not, be less than the correction signal at which the actuator driver saturates. For seeks in which actuator driver saturation does not occur during acceleration of the transducer 28, the current that is to be supplied by the actuator driver will not exceed the nominal current used to generate the velocity profile so that the seek can be carried out using maximum correction signals that might be generated during the seek without introducing excessive lag of the transducer velocity with respect to the velocity profile. The minimum seek length for which saturation of the actuator driver 50 will occur, generally of the order of 100 tracks, can be determined by measuring the actuator current as a function of the correction signal under a selection of operating conditions. If the seek length is less than this minimum, a scale factor, used in a manner that will be described below is set to 1, step 126, and the mode to be called in the next interrupt in which the seek commences is set to seek, step 128, and the seek initialization mode routine ends. If the seek length exceeds the minimum seek length, a demand adjust flag is set, step 130, and the address of the track from which the seek commenced is saved, step 132, prior to setting the mode to seek at step 128. The seek is then carried out by repetitive execution of the seek mode routine that has been illustrated in FIG. 8, such executions of the seek mode routine occurring in successive interrupts of the microprocessor 46 until the transducer reaches the distance, indicated as J tracks from the target track in FIG. 4, at which settle commences.

Figure 8:
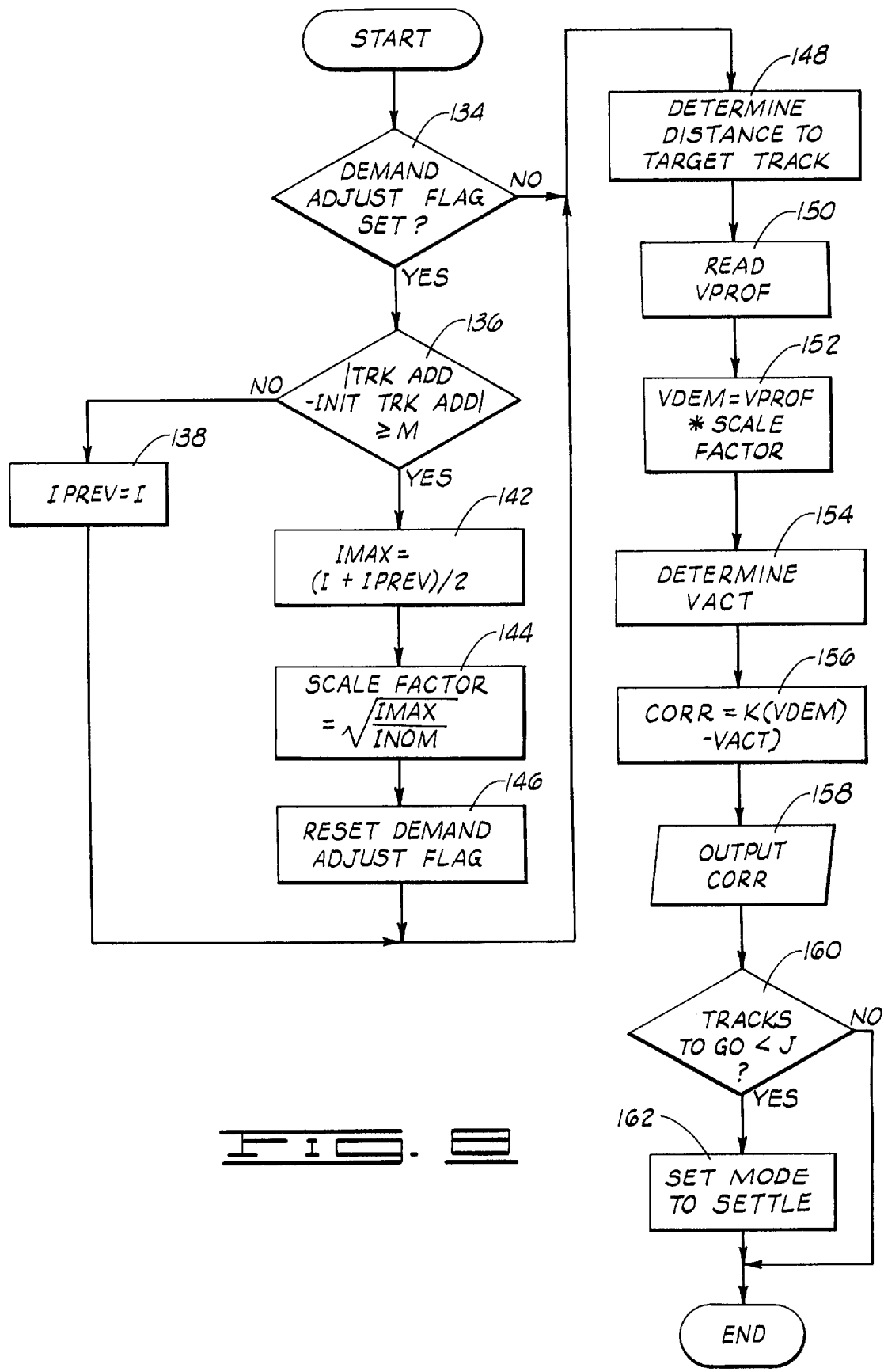
FIG. 8 is a flow chart of a seek mode routine that is carried out during the interrupt program of FIG. 5.

Referring to FIG. 8, the seek mode routine in each interrupt begins, at step 134, with a check to determine whether the demand adjust flag has been set in the interrupt in the seek initialize routine of FIG. 7. For clarity of presentation, it will be useful to consider the case in which this flag has been set and return to the case in which it has not following the discussion of the manner in which the seek is carried out at such times that the flag has been set.

If the demand adjust flag is set, the distance the transducers have moved since the seek commenced is checked, step 136, by comparing the difference between the current and initial track addresses to the number of tracks M corresponding to the line 98 in FIG. 3, to determine whether the transducers have reached a distance from the initial track for which the actuator current is substantially a maximum.

If not, the value of the current inputted to the microprocessor 46 at the beginning of the interrupt in which the seek routine is executed (See FIG. 5) is stored, step 138, as a previous current for the ensuing interrupt.

Eventually, while the seek proceeds, the transducer 28 will reach the distance indicated by the line 98 in FIG. 3 and a measure of the maximum current available to accelerate and decelerate the transducer 28 is determined in the following step; that is, step 142 in FIG. 8. While such measure can be selected to be the actuator current inputted at the beginning of the interrupt in which the attainment of the distance 98 is detected, it is preferable, to minimize the effect of noise, to average the actuator current inputted in the such interrupt with the actuator current that has been inputted at the beginning of the previous interrupt as indicated at step 142 in FIG. 8. Thus, the maximum available current, Imax, that will be determined in step 142 will be the average of the current at the beginning of the time intervals 101 and 102 in FIG. 3.

Following determination of the maximum actuator current, Imax, available for the acceleration and deceleration of the transducer 28 under existing conditions, a scale factor is determined, step 144, from such maximum available current and the nominal current used to design the velocity profile 56A. Preferably, the scale factor is matched to the form of the velocity profile to permit maximization of the ratio of the nominal current to the maximum current the actuator driver 50 is designed to pass through the actuator coil 40 in the design of the velocity profile. For a profile having a deceleration portion determined assuming deceleration at a constant rate determined by the nominal current, the scale factor is selected to be the square root of the ratio of the maximum available current under existing conditions to the nominal current. Such selection is based on the relationship between the distance and velocity for a constant deceleration; that is, for constant deceleration, the velocity at a specific distance from the target would be related to the square root of such distance. For other velocity profiles, the scale factor that will permit maximization of the nominal current in the design of the velocity profile can similarly be determined using the dependence of velocity on distance for the selected form the profile velocity is to have.

While selection of a scale factor as described above will permit maximization of the nominal current in the design of a profile and, consequently, minimization of seek time, it has also been found that significant reduction in seek time can be effected using a scale factor that is directly proportional to the ratio of the maximum available current under existing conditions and the nominal current used to design the velocity profile. It has been found that, using the direct ratio of the currents as the scale factor, the nominal current used to design a velocity profile based on constant deceleration of the transducer 28 at a rate determined by the nominal current can be selected to be 95 percent of the maximum design current of actuator driver 50. Thus, while the scale factor is preferably selected to be the square root of the ratio of the maximum actuator coil current that can be achieved under existing conditions to the nominal current used to design the velocity profile, the method of the present invention is not limited to such selection. Rather, such selection has been indicated in FIG. 8 in the spirit of providing a concrete example that will facilitate an understanding of the present invention.

Once the scale factor has been determined, the demand adjust flag is reset, step 146, and the seek mode routine proceeds to steps in which the correction signal is determined and outputted to the actuator driver 50. With reset of the demand adjust flag, the routine will proceed directly to these steps in succeeding interrupts as indicated by the "NO" line from decision block 134 in FIG. 8.

As described above with respect to FIG. 7, the address of the target track is inputted (Step 120) to the microprocessor 46 during the seek initialization mode routine that precedes execution of the succession of seek mode routines that accelerate the transducer 28 away from the initial track and subsequently decelerate the transducer 28 toward the target track and, as described above with respect to FIGS. 1 and 5, the address of the track most closely aligned with the transducer 28 at the time a servo frame giving rise to an interrupt of the microprocessor 46 passes the transducer 28 is inputted to the microprocessor 46 at the beginning of the interrupt (Step 104 of FIG. 5). Accordingly the distance to the target track at the beginning of each interrupt is determinable and such distance is determined, at step 148, as the initial step of generation of the correction signal to be outputted to the actuator driver.

The profile velocity corresponding to the distance to the target track at the beginning of the interrupt is determined from the velocity profile, step 150, and, in the practice of the present invention, used to generate a demand velocity VDEM, step 152, from which the correction signal will be determined. Specifically, the demand velocity is the product of the profile velocity and the scale that has been determined for the seek. Following determination of the demand velocity, the actual velocity of the transducer 28 across the dedicated servo surface is determined in the conventional manner that has been described above, step 154, and the correction signal is generated in proportion to the difference between the demand and actual velocities of the transducer 28 at step 156.

The correction signal is then outputted to the actuator driver 50, step 158, to determine the current that will be passed through the actuator coil 46. In initial interrupts in which the seek is effected, the correction signal will cause the actuator driver to saturate, as in conventional seek methods, and will be proportional to the correction signal as the transducer 28 approaches a velocity that is equal to the demand velocity determined at step 152 of FIG. 8. The interrupt then ends after executing a check, step 160, to determine whether the transducer 28 has reached the number of tracks from the target track at which settle is to begin and, if so, setting the mode to be executed in the next interrupt to the settle mode, step 162, for final settling of the transducer 28 on the target track in a conventional manner.

The effect of using the demand velocity, determined from the scale factor as has been described, in place of using the profile velocity to generate the correction signal has been illustrated in FIG. 4 for two seeks made under differing existing conditions determining differing maximum currents that the actuator driver 50 can pass through the actuator coil 40. Where such maximum current is substantially the nominal current used to design the velocity profile, the scale factor will be approximately one and the transducer 28 will achieve a maximum velocity that is substantially equal to the maximum profile velocity as indicated for the curve 92 in FIG. 4. During deceleration of the transducer 28, the demand velocity will again be substantially the profile velocity so that the transducer 28 will closely follow the velocity profile during the deceleration phase of the seek, as indicated by the portion 164 of the curve 92, to arrive at the distance from the target track at which settle is to begin with a residual velocity Vres1 that is only slightly larger than the profile velocity for that distance. Consequently, the transducer 28 can be rapidly settled on the target track using the relatively large actuator coil current that is available in this case. Since the nominal current used to develop the velocity profile has been selected to be a large percentage of the actuator driver maximum design current, both the acceleration and deceleration times, as well as the settle time, will be minimized for the curve 92 to minimize the time required for movement of the transducer 28 to the target track.

Under conditions in which the maximum current the actuator driver 50 can supply to the actuator coil 40 is substantially less than the nominal velocity used to generate the velocity profile, the scale factor will be have a correspondingly reduced value to cause the maximum velocity the transducer 28 attains to be less than the maximum profile velocity, as indicated at 166 in FIG. 4. Consequently, deceleration of the transducer 28 will begin with a velocity from which the available current that can be supplied by the actuator driver 50, under existing conditions, will suffice to decelerate the transducer 28 to a relatively low residual velocity Vres2 from which settling can be rapidly effected. More particularly, the current the actuator driver 50 can supply to the actuator coil 40 will cause the transducer 28 to follow a trajectory, indicated at 168 in FIG. 4, that closely tracks an effective velocity profile (not shown) that is lower than the velocity profile by the scaling of the profile velocity in determining the demand velocity. Consequently, the transducer 28 will arrive at the distance from the target track at which settle is to begin with a reduced residual velocity Vres2 that will enable settle to be effected in a minimum time with the lower current the actuator driver 50 can supply to the actuator coil 40 under existing conditions. Moreover, since the acceleration and deceleration of the transducer 28 will also have been effected using a demand velocity that is scaled from the profile velocity in relation to the maximum current the actuator driver can supply under existing conditions, the movement of the target track will be effected in the minimum time possible under the existing conditions.

Referring once again to FIG. 7, it is again noted that the scale factor is set to one for minimal length seeks in which the current that is supplied to the actuator coil 40 will not reach the maximum current the actuator driver 50 can supply under existing conditions. Since the seek length in such circumstances prevents the transducer 28 from reaching a velocity that would prevent the transducer 28 from substantially following the velocity profile during deceleration, so that a rapid settle can be subsequently effected, the use of a scale factor of one for such seeks will cause such seeks to be effected in the minimum possible time.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a method for moving a transducer of a disc drive from an initial track on the surface of a disc to a target track on the disc surface, the method including a seek phase wherein the transducer is initially accelerated from the initial track and subsequently decelerated toward the target track in relation to electrical currents supplied by an actuator driver to an actuator whereon the transducer is mounted by adjusting the actuator current in each of a succession of time intervals in relation to a profile velocity determined in relation to the distance between the transducer and the target track, the improvement comprising the steps of:

for a seek having a length greater than a preselected minimum seek length, measuring the actuator current during acceleration of the transducer for at least one time interval selected to determine substantially the maximum current the actuator driver can supply to the actuator;

generating a scale factor from said measured actuator current and a preselected nominal actuator current, said scale factor increasing in a preselected relation to the ratio of the measured actuator current to the nominal actuator current; and thereafter, in each of said time intervals, the steps of:
scaling the profile velocity with said scale factor to generate a demand velocity;
determining the velocity of the transducer with respect to the disc surface;
generating a correction signal from the difference between the demand velocity and the velocity of the transducer with respect to the disc surface; and
transmitting the correction signal to the actuator driver to control the current supplied to the actuator.

2. The method of claim 1 wherein the actuator current is measured for a plurality of time intervals during acceleration of the transducer and averaged to determine substantially the maximum current the actuator driver can supply to the actuator.

3. The method of claim 2 wherein the step of generating a scale factor from the measured actuator current and the nominal actuator current is further characterized as selecting the scale factor to be the square root of the ratio of the measured actuator current to the nominal actuator current.

4. The method of claim 1 wherein the step of generating a scale factor from the measured actuator current and the nominal actuator current is further characterized as selecting the scale factor to be the square root of the ratio of the measured actuator current to the nominal actuator current.

5. In a disc drive having a disc and an actuator adjacent the disc, the actuator including a transducer and an actuator coil, the disc drive further having an actuator driver for supplying current to the actuator coil to accelerate the transducer from an initial track and subsequently decelerate the transducer toward a target track, wherein the current supplied by the actuator driver is adjusted in each of a succession of time intervals in relation to the distance between the transducer and the target track, a method for performing a disc drive seek comprising the steps of:

providing a profile velocity determined from a nominal actuator current that is a preselected percentage of the maximum design current that the actuator driver can supply;

measuring the actuator current during acceleration of the transducer to determine substantially the maximum current the actuator driver can supply to the actuator during the seek;

generating a scale factor from the measured actuator current and the nominal actuator current, said scale factor increasing in a preselected relation to the ratio of the measured actuator current to the nominal actuator current;

generating a demand velocity by scaling the profile velocity with the scale factor;

determining the actual velocity of the transducer;

generating a correction signal from the difference between the demand velocity and the actual velocity; and using the correction signal to control the current supplied to the actuator by the actuator driver.

6. The method of claim 5, wherein the step of measuring the actuator current during acceleration of the transducer comprises measuring and averaging the actuator current over a plurality of time intervals to determine substantially the maximum current the actuator driver can supply to the actuator.

7. The method of claim 5, wherein the step of generating a scale factor from the measured actuator current and the nominal actuator current further comprises selecting the scale factor to be the square root of the ratio of the measured actuator current to the nominal actuator current.

* * * * *